Figure 1:
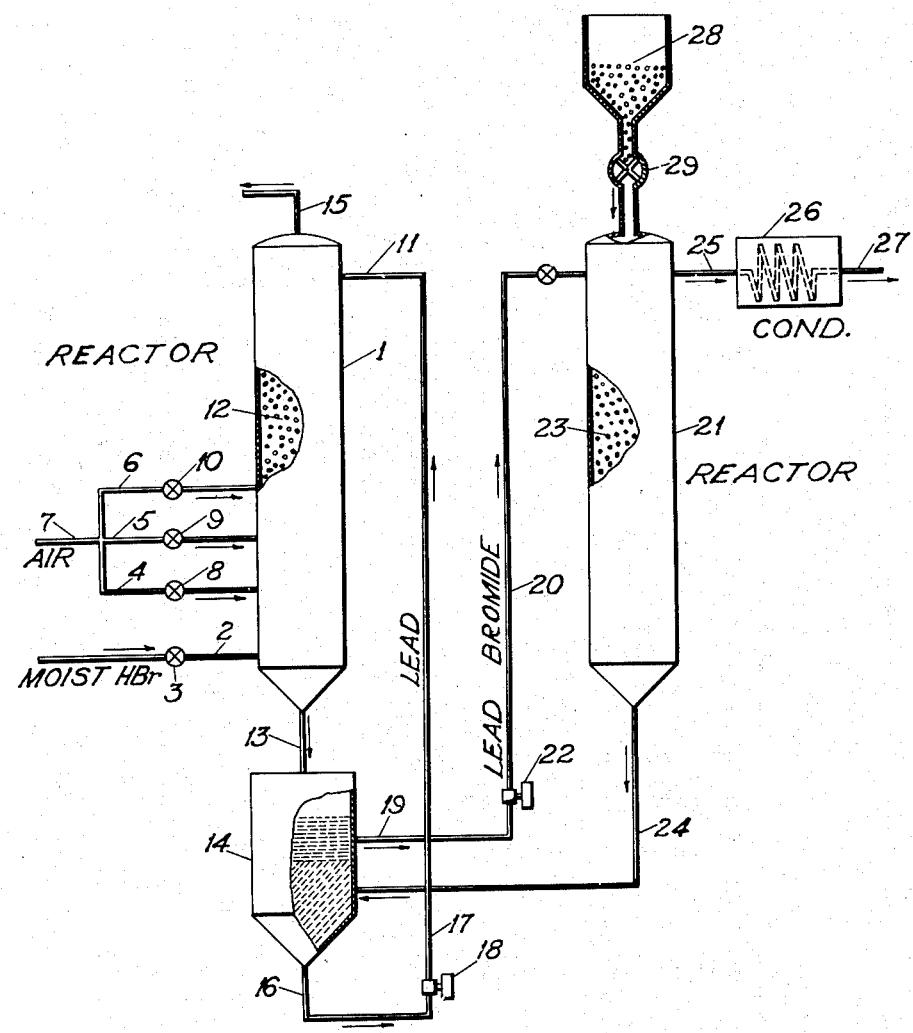

Patented July 16, 1946

2,404,055

UNITED STATES PATENT OFFICE 2,404,055

PREPARATION OF HALIDES

Everett Gorin, Dallas, Tex., assignor, by mesne assignments, to Socony-Vacuum Oil Company, Incorporated, New York, N. Y., a corporation of New York Application March 19, 1943, Serial No. 479,803

12 Claims. (Cl. 23—96)

This invention relates to the recovery of aluminum halide catalysts from aluminum halide-hydrocarbon complexes formed when aluminum halides are used as catalysts for the catalytic conversion of hydrocarbons. More particularly this invention is concerned with the recovery of the halogen content of aluminum halide tarry complexes.

It has been proposed to recover the halogen content of such tars by either hydrolyzing the tar or by burning the tar in the presence of air. Both of these methods produce the halogen acid in admixture with water vapor. This moist halogen acid is not suitable for the production and regeneration of the aluminum halide.

The problem of producing the anhydrous halogen acid from the moist acid is not an easy one because the ordinary regenerable desiccants such as silica gel, bauxite, activated alumina, calcium halides, etc., absorb considerable quantities of the halogen acid along with the water vapor. Anhydrous hydrochloric acid may be produced from the moist acid containing more than 20 percent hydrogen chloride by low temperature fractionation, but this is a difficult and expensive operation and only incomplete recovery of the hydrogen chloride content is obtained. Instead of converting the moist halogen acid into an anhydrous halogen acid, and making aluminum halide from the anhydrous acid, I propose to convert the halogen content of the moist halogen acid into a reactive metal halide which has a very small affinity for water vapor. The reactive halide is then reacted with metallic aluminum, aluminum carbide or an alumina-coke mixture to reform the aluminum halide catalyst.

My invention is primarily concerned with the development of a process for the recovery and reutilization of the halogen acids produced by the hydrolysis of spent catalyst residues or produced by the combustion of the spent catalyst residues in air. I am particularly concerned with the aluminum halide catalyst residues produced when these compounds are used as catalysts for the catalytic conversion of hydrocarbons. The use of aluminum chloride for the catalytic conversion of hydrocarbons is well known. In the reaction complex aluminum chloride-hydrocarbon compounds are formed which are of a tarry character. Many processes have been proposed for the recovery of the aluminum chloride values from these tars. Prominent among the methods proposed is that of hydrolyzing the tar. A typical process for such hydrolysis is that disclosed by Ernest B. Phillips in U. S. Patent 1,760,962, granted June 3, 1930. Aluminum bromide when used as a catalyst for the conversion of hydrocarbons also reacts with the hydrocarbons to form a complex tar as disclosed in copending application Serial No. 448,886, filed June 29, 1942, by Manuel H. Gorin and Will Swerdloff. The aluminum bromide values in these tarry residues may also be separated from the hydrocarbons by hydrolysis of the tar. This hydrolysis is generally carried out by subjecting the tar to the action of steam. As a result of the hydrolysis of either an aluminum chloride or aluminum bromide tar there is produced the corresponding halogen acid mixed with large amounts of water vapor. The halogen acids in a moist condition cannot be used for regeneration of the aluminum halide catalyst without the prior removal of the water.

It is an object of my invention to prepare a substantially anhydrous halogen compound from a moist halogen acid produced by the hydrolysis or combustion of an aluminum halide tar residue which is suitable for use in regenerating the aluminum halide catalyst.

Another object of my invention is the regeneration of an aluminum halide catalyst utilizing the halogen content of an aluminum halide tar catalyst residue by producing a moist halogen acid from the tar residue and converting this into an anhydrous reactive halide compound.

Other and further objects of my invention will be apparent from the description thereof and from the appended claims.

According to the process of my invention the halogen content of the moist halogen acid produced by the hydrolysis of spent catalyst residues is recovered in a substantially anhydrous form by converting the halogen acid into a reactive halide which has a very small affinity for water vapor. According to my process the moist halogen acid is reacted with a heavy metal selected from the group consisting of lead, zinc, tin, silver, copper and mercury. Preferably the metal is reacted with the moist halogen acid while in a molten or vaporous condition. Metals which have a high melting point such as silver and copper may be alloyed with metals such as zinc, lead or mercury to form a lower melting alloy, and thus avoid the necessity for the use of extremely high temperatures in the process with consequent increase in operating difficulties.

The reaction is preferably carried out in the presence of oxygen or air, since the reaction

does not always go to completion, especially where the metal is silver or mercury. Likewise, even where the reaction would go to completion, the addition of oxygen usually makes the reaction proceed more rapidly possibly because of the removal of one of the products of the reaction. In the presence of oxygen the reaction may be expressed as $$Me + 2HX + 1/2 O_2 \rightarrow MeX_2 + H_2O$$

Where oxygen or air is used, however, the quantity of oxygen used must not be in excess of that theoretically required to convert all of the hydrogen liberated by the reaction of the halogen acid with the metal to water. Were excess oxygen to be used part of the metal would be converted to the oxide. Preferably slightly less air or oxygen is used than is theoretically necessary to convert all of the liberated hydrogen to water. It is also preferable to introduce oxygen uniformly throughout the reaction zone to minimize the occurrence of zones in which there is excess oxygen wherein the metal oxides would be formed.

My invention may be better understood by reference to the drawings and the description of the specific preferred mode of operation thereof.

Referring to Figure 1, a hydrogen bromide-steam mixture obtained by the hydrolysis of an aluminum bromide tar is fed into the reactor 1, through line 2, provided with a suitable control valve 3. Air is introduced into the reactor through the lines 4, 5, and 6, connected to a source of compressed air (not shown) from line 7. Control valves 8, 9, and 10, are provided in lines 4, 5, and 6, respectively, so that the distribution of the air in the reaction zone may be controlled. Molten lead is fed into the top of the reactor through the line 11. The reactor 1 is packed with an inert material 12, such as refractory Raschig rings or Carborundum chips over which the molten lead flows in its descent through the reactor. This serves to provide good contact between the descending molten lead and the ascending hydrogen bromide, steam, and the oxygen. Suitable means (not shown) are provided to maintain the reactor within a temperature range of from 375° C. to 600° C. The reaction is highly exothermic, and, therefore, with a properly constructed reactor it is possible to maintain the temperature within the desired range with little or no external heating. The reaction is preferably carried at a temperature as little as possible above 375° C. to minimize difficulties arising from volatilization of the halide.

As a result of the reaction between the hydrogen bromide and the molten lead flowing downwardly through the reactor, part of the lead is converted to lead bromide, which is molten at the temperature in the reactor. This molten lead bromide and the unreacted lead flow out of the bottom of the reactor through line 13, into settling tank 14. Water vapor, produced as a result of the reaction between the lead and the hydrogen bromide in the presence of oxygen, and from the initial mixture, together with the nitrogen from the air flow out from the top of the reactor through line 15. In the settling tank 14, the lead and the lead bromide separate into two layers because of the difference in their specific gravities. The lead which settles to the bottom is drawn off through line 16 and returned to line 11 through line 17 by means of the pump 18. Suitable means (not shown) are provided to maintain the lead in the settling tank 14 and in the lines 16, 17, and 11 in the molten condition. The lead bromide is drawn off from the settling tank through the line 19 and is fed through line 20, into a second reactor 21. A pump 22 is provided in line 20 to feed the molten lead bromide. Reactor 21 is packed with metallic aluminum 23 in the form of granules, chips, or turnings. The molten lead bromide flows down through the metallic aluminum contained in the reactor 21, which is maintained at a temperature slightly above the melting point of the lead bromide. At this temperature the aluminum will react vigorously with the lead bromide to reform the aluminum bromide catalyst. Molten lead regenerated by this reaction flows from the bottom of the reactor 21, through line 24, and is returned to the settling tank 14, for recycling in reactor 1. Aluminum bromide which is volatile at the temperature in reactor 21 is vaporized and driven out from the top thereof through line 25, condensed in condenser 26, and the molten aluminum bromide sent through line 27, either to product storage or reused directly in a hydrocarbon conversion process. Metallic aluminum is supplied to reactor 21, from hopper 28, through the gas sealed rotary valve 29, operated by a motor (not shown).

Figure 2:
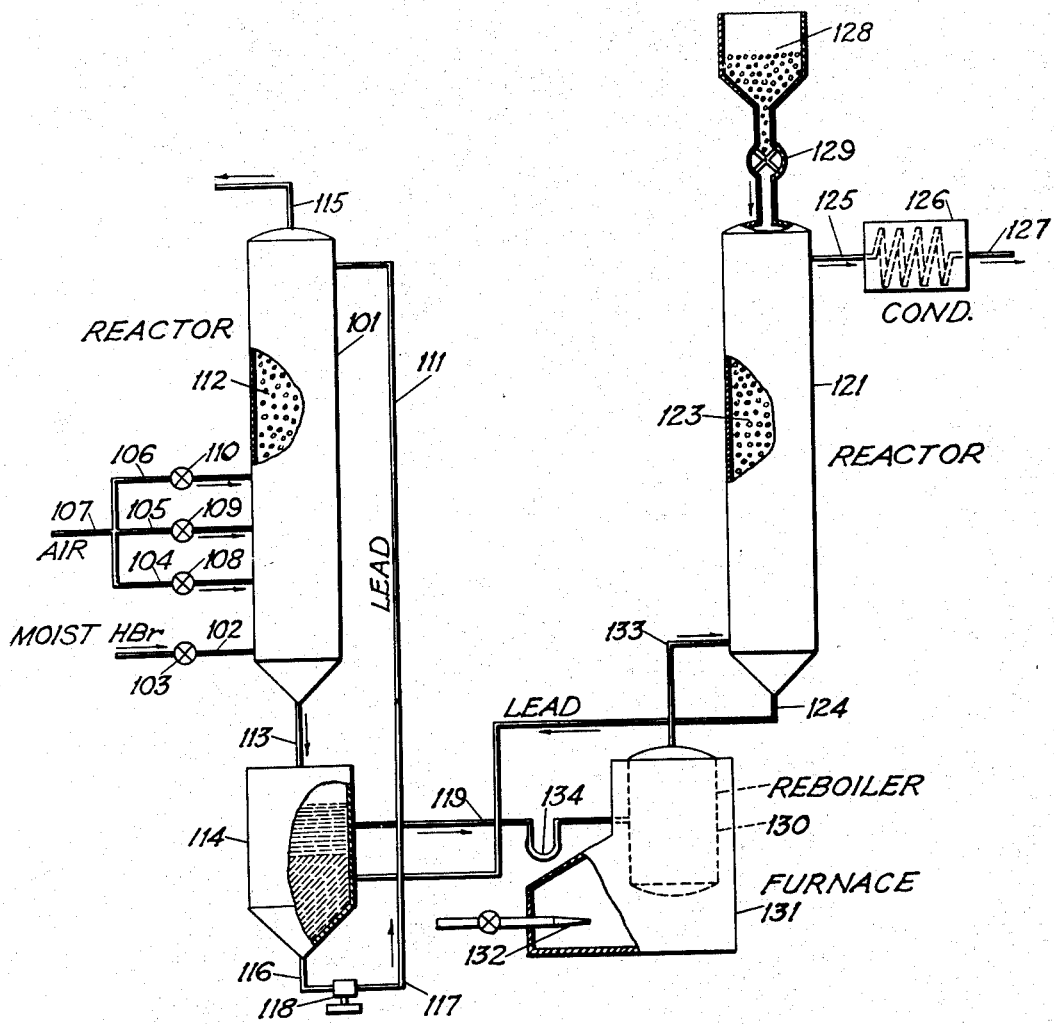

Referring to Figure 2, the operation of the reactor 101 and the settling tank 114 is the same as described previously in connection with the description of the process illustrated by Figure 1. In Figure 2, however, the aluminum halide is regenerated by the use of aluminum carbide or an alumina-coke mixture instead of metallic aluminum. When aluminum is in the form of the carbide considerably higher temperatures are desirable in order to bring about the reaction, and it is preferable to add the lead bromide in the form of a vapor. The temperature of the reactor 121 is maintained above 600° C., preferably at 700° to 1000° C. In order to vaporize the lead bromide flowing from the settling tank 114, through the line 119, a lead bromide vaporizer 130 is provided into which the lead bromide flows from line 119. This vaporizer is heated by being placed in a furnace 131, provided with suitable gas or oil burners 132. Lead bromide vapor flows from the top of the vaporizer 130, through line 133, into the bottom of reactor 121. Preferably a trap 134 is provided in line 119 to prevent lead bromide vapor from flowing back through line 119 into the settling tank 114. The lead bromide vapor in ascending through the reactor 121 reacts with the aluminum carbide to liberate the metallic lead and to form aluminum bromide. The aluminum bromide passes out from the top of the reactor 121, through line 125, is condensed in line 126, and recovered from line 127, as described in connection with the description of Figure 1. The molten lead liberated by the reaction is returned to the settling tank 114, through line 124, as previously described in connection with the description of Figure 1.

The methods of carrying out my process as described above in connection with the description of the mode of operation of Figure 1 and Figure 2 are the preferred modes of operation. Since copper and silver are fairly high melting metals, it may be desirable to alloy these metals with one or more of the lower melting metals such as the lead, zinc or tin. These alloys may be very satisfactorily handled where the aluminum halide is being formed from either an alumina-coke mixture or aluminum carbide. Where copper or silver are used and the aluminum halide is to be formed from the action of the copper or silver halide on aluminum the procedure described below is preferred to avoid the difficulty of reforming the alloy from the halide mixture at a temperature below the melting point of aluminum.

With copper or silver, the packing would be eliminated from the reactors shown in Figures 1 and 2, except for an upper packed section. The lower part of the first reactor would be charged with copper or silver powder. The moist halogen acid entering the reactor would react with the metallic powder, and, under the reaction conditions, form the molten metallic halide. The halide would be passed to a second reactor having the same general arrangement as the first, but filled with metallic aluminum powder or turnings. The reaction between the metallic halide and the aluminum would form aluminum halide vapor as described previously, and liberate the copper or silver as a powder. Part of this powder would tend to pass out of the second reactor with the heavy aluminum halide vapor, but most of this would be removed by the packing. Obviously, a suitable arrangement of baffle plates in the top of the reactor could be employed instead of the packing. The reaction would be continued until all of the aluminum were halogenated to aluminum halide. The second reactor would then contain metallic silver or copper in powder form, and would then be treated with the moist halogen acid air mixture to reform the metallic halide. Reactor 1, would have had most or all of its metal powder charge halogenated, and would then be charged with metallic aluminum. The metallic halide being formed in the second reactor would be flowed into the first reactor at a point below the packed section wherein aluminum halide would be formed in the same manner as described above. The operation would be cyclic in character, with moist acid and metallic aluminum charged alternately to each reactor. In such a process the reaction should be run until all of the aluminum has been driven off as aluminum halide before the cycle is reversed by feeding the moist halogen acid into the reactor. Excess copper or silver mixed with the aluminum in the aluminum halide formation step would do no harm, and would be advisable so that there would be sufficient copper or silver for the metallic halide formation step. A small amount of copper or silver as make-up may be charged along with the aluminum, since some of these metals would be lost from the reaction zone into the packing. Periodically the packing may be removed from the upper sections of the reactors and the copper or silver recovered therefrom by treatment with the moist halogen acid.

Inasmuch as mercuric halides normally sublime at atmospheric pressure, the system described above in connection with the discussion of Figures 1 and 2 would have to be maintained under pressure where this material was used in the process. Instead of operating the system under pressure, it might be preferable to allow the mercuric halide vapor to pass overhead along with the water vapor and inert gases from the first reactor. Since the mercuric halide vapors will condense at temperatures considerably above the other gases present in the mixture, the mercuric halide would be condensed directly to a solid, and separated from the water and inert gases. The mercuric halide would then be revaporized, and passed through the metallic aluminum in the manner shown in Figure 2. Preferably two condensers would be used, one of which would be serving as a revaporizer, and the other as a condenser, in cyclic operation so that the process would be continuous.

Some of the metals, particularly tin, and to a lesser extent copper, lead and zinc, will be partly oxidized at the high temperature involved even though the oxidizing gas contains an excess of HBr. Localized overheating and zones of excess oxygen are substantially impossible to prevent in a commercial apparatus. It is therefore desirable that the metal-metallic halide mixture be scrubbed with the incoming moist acid prior to its discharge from the reaction zone. At the reaction temperature any oxidized metal will be halogenated by the acid and the halide of the metal formed. For this reason the principle of countercurrent flow of the metal and the moist halogen acid is especially advantageous with the oxidizing gases introduced at an intermediate zone. This is particularly true in the case of tin because in the presence of an oxidizing gas the stannous bromide will readily be oxidized to stannic oxybromide. By contacting this compound with halogen acid in the presence of metallic tin the stannic oxybromide will be reduced according to the equation

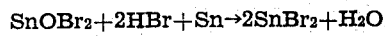

$$SnOBr_2 + 2HBr + Sn \rightarrow 2SnBr_2 + H_2O$$

The reaction is preferably carried out in the presence of an excess of the metal. This offers the advantage that there is always sufficient metal to react with the halogen content of the moist halogen acid being treated. It also insures the formation of the lower valence halide in those cases in which the metallic halide might have either of two valences. This is particularly important in the case of such metals as tin and copper. In the case of tin, the stannic chloride if it were formed would be hygroscopic. In the case of copper the cupric chloride sublimes at very high temperature and this material would be extremely difficult to handle.

I have referred to the use of an alumina-coke mixture for reacting with the reactive metallic halide to reform the aluminum halide catalyst. This reaction, like that with aluminum carbide, requires the use of high temperatures, in the neighborhood of 1000° C., to effect the desired reaction. The alumina-coke mixture may be derived from the residue of the tar catalyst after the halogen has been recovered by hydrolysis by heating to drive off first the water, then the hydrocarbons, and finally given an oxidizing roast to form an alumina-coke residue. Where the alumina-coke residue is utilized as the source of the aluminum for the regeneration of the aluminum halide catalyst obviously all the values of the original catalyst are recovered and regenerated in the original form. Whether it is more economical to recover the aluminum value in the catalyst residue or merely to recover the halogen value and utilize scrap aluminum to regenerate the catalyst is a matter to be determined by the relative quantities available, the cost of building and operating the equipment at the higher temperature level with the alumina-coke residue and the cost and availability of scrap aluminum.

The following specific example illustrates the process of my invention:

*Example*

The tarry residue settling out of a normal paraffin isomerization reaction, in which the reaction, carried out in the liquid phase, was catalyzed by aluminum bromide, was drawn off for recovery of the catalyst. The tar on analysis showed an aluminum bromide content of 61.6 percent. 500 grams of this tar, containing 308 grams of aluminum bromide or 276.5 grams of bromine, was calcined in a stream of air at 500° C. 270 grams of HBr were formed on a dry basis, or 95 percent of the bromine in the tar was converted to hydrogen bromide. This gas was passed at the rate of 1 cc. per minute through a glass tower filled with packing. A stream of molten lead at a temperature of 500° C. was flowed downwardly through the tower countercurrent to the ascending gas stream. The effluent from the bottom of the tower was allowed to separate into two layers, and the upper or lead bromide layer weighed 598 grams. This quantity of plumbous bromide contains 259 grams of bromine indicating that 98.6 percent of the hydrogen bromide was converted to molten anhydrous lead bromide.

The molten lead bromide was then contacted with granular metallic aluminum at a temperature of 450° C. A vigorous reaction set in immediately and the aluminum bromide formed distilled out of the reactor. The aluminum bromide vapor was condensed, and 282 grams of aluminum bromide recovered. This indicated that 252.5 grams of bromine or 97.5 percent of the bromine in the lead bromide was recovered as aluminum bromide. The overall recovery of aluminum bromide for the process was 282 grams out of an original 308 grams or 91.6 percent. 30 grams of aluminum were required for the regeneration of the aluminum bromide.

The reaction between the moist halogen acid and the metal is preferably effected at a temperature not greater than about 700° C. At higher temperatures the metallic halide becomes increasingly reactive with the water vapor. The volatility of the metallic halide also becomes too high at higher temperatures. The reaction may be carried out within the temperature range of from 300° to 700° C., with the temperature preferably maintained between about 375° C. and about 600° C. The temperature at which the halide is reacted with the aluminum is not particularly important, but for proper operation of the process a temperature between the melting point of the halide and the melting point of the aluminum is used. Preferably the temperature is maintained as low as possible consistent with the maintenance of the halide in the molten condition. With the high melting halides, as mentioned above, the reaction may be carried out between molten aluminum and the solid halide.

In the case of the reaction between the metal halide and aluminum carbide higher temperatures, in the neighborhood of 700° C. or higher are required. Where an alumina-coke mixture is used, still higher temperatures, in the neighborhood of 1000° C. are necessary.

The foregoing description of my invention is illustrative of the preferred embodiments thereof, and my invention is not to be construed as limited except as indicated in the appended claims.

I claim:

1. The process for the recovery of the chlorine content of moist hydrogen chloride produced from an aluminum chloride-hydrocarbon complex formed when aluminum chloride is used as a catalyst for a hydrocarbon conversion process and the production of aluminum chloride therefrom which comprises passing the mixture of hydrogen chloride and water at a temperature between 300° C. and 700° C. in contact with a metal selected from the group consisting of lead, zinc, tin, silver, copper and mercury, whereby the corresponding metal chloride is formed by the action of the hydrochloric acid on the metal, separating the water from the metal chloride, reacting the metal chloride at a temperature above 300° C. with a member of the group consisting of metallic aluminum, aluminum carbide, and an alumina-coke mixture, collecting the evolved aluminum halide vapor and condensing and recovering the aluminum chloride.

2. The process for the recovery of the bromine content of moist hydrogen bromide produced from an aluminum bromide-hydrocarbon complex formed when aluminum bromide is used as a catalyst for a hydrocarbon conversion process and the production of aluminum bromide therefrom which comprises passing the mixture of hydrogen bromide and water at a temperature between 300° C. and 700° C. in contact with a metal selected from the group consisting of lead, zinc, tin, silver, copper and mercury, whereby the corresponding metal bromide is formed by the action of the hydrobromic acid on the metal, separating the water from the metal bromide, reacting the metal bromide at a temperature above 300° C. with a member of the group consisting of aluminum, aluminum carbide, and an alumina-coke mixture, collecting the evolved aluminum halide vapor and condensing and recovering the aluminum bromide.

3. The process for the recovery of the halogen content of a moist halogen acid selected from the group consisting of moist hydrochloric acid and moist hydrobromic acid produced from an aluminum halide-hydrocarbon complex formed when the corresponding aluminum halide is used as a catalyst for a hydrocarbon conversion process and the production of aluminum halide therefrom which comprises passing the mixture of halogen acid and water in the vapor phase at a temperature between 300° C. and 700° C. in contact with a metal selected from the group consisting of lead, zinc, tin, silver, copper and mercury, whereby the corresponding metal halide is formed by the action of the halogen acid on the metal, separating the water from the metal halide, reacting the metal halide at a temperature above 300° C. with a member of the group consisting of metallic aluminum, aluminum carbide, and an alumina-coke mixture, collecting the evolved aluminum halide vapor and condensing and recovering the aluminum halide.

4. The process for the recovery of the halogen content of a moist halogen acid selected from the group consisting of moist hydrochloric acid and moist hydrobromic acid produced from an aluminum halide-hydrocarbon complex formed when the corresponding aluminum halide is used as a catalyst for a hydrocarbon conversion process and the production of aluminum halide therefrom which comprises passing the mixture of the halogen acid and water at a temperature between 300° C. and 700° C. in contact with a metal selected from the group consisting of lead, zinc, tin, silver, copper and mercury, whereby the corresponding metal halide is formed by the action of the halogen acid on the metal, separating the water from the metal halide, reacting the metal halide at a temperature above 300° C. with metallic aluminum, collecting the evolved aluminum halide vapor, and condensing and recovering the aluminum halide.

5. The process for the recovery of the halogen content of a moist halogen acid selected from the group consisting of moist hydrochloric acid and moist hydrobromic acid produced from an aluminum halide-hydrocarbon complex formed when the corresponding aluminum halide is used as a catalyst for a hydrocarbon conversion process and the production of aluminum halide therefrom which comprises passing the mixture of the halogen acid and water in the vapor phase into a packed reactor, flowing molten lead through the reactor countercurrent to the stream of moist halogen acid vapors, admitting oxygen into the reactor at a plurality of points intermediate the points of entry of the molten lead and the moist halogen acid vapors, regulating the quantity of oxygen added so that not more than one mole of oxygen is added per four moles of halogen acid, whereby the corresponding lead halide is formed by the action of the halogen acid on the molten lead, separating the water from the lead halide, reacting the lead halide at a temperature above 300° C. with a member of the group consisting of metallic aluminum, aluminum carbide, and an alumina-coke mixture, collecting the evolved aluminum halide vapor and condensing and recovering the aluminum halide.

6. The process for the recovery of the halogen content of a moist halogen acid selected from the group consisting of moist hydrochloric acid and moist hydrobromic acid produced from an aluminum halide-hydrocarbon complex formed when the corresponding aluminum halide is used as a catalyst for a hydrocarbon conversion process and the production of aluminum halide therefrom which comprises passing the mixture of the halogen acid and water in the vapor phase into a packed reactor containing metallic copper, admitting oxygen into the reactor, regulating the quantity of oxygen added so that not more than one mole of oxygen is added per four moles of halogen acid, whereby the corresponding copper halide is formed by the action of the halogen acid on the metallic copper, separating the water from the copper halide, reacting the copper halide at a temperature above 300° C. with a member of the group consisting of metallic aluminum, aluminum carbide, and an alumina-coke mixture, collecting the evolved aluminum halide vapor and condensing and recovering the aluminum halide.

7. The process of claim 4 in which the halogen recovered is chlorine.

8. The process of claim 4 in which the halogen recovered is bromine.

9. The process for the recovery of the halogen content of a moist halogen acid selected from the group consisting of moist hydrochloric acid and moist hydrobromic acid produced from an aluminum halide-hydrocarbon complex formed when the corresponding aluminum halide is used as a catalyst for a hydrocarbon conversion process and the production of aluminum halide therefrom which comprises passing the mixture of the halogen acid and water in the vapor phase into a packed reactor, flowing molten lead through the reactor countercurrent to the stream of moist halogen acid vapors, admitting oxygen into the reactor at a plurality of points intermediate the points of entry of the molten lead and the moist halogen acid vapors, regulating the quantity of oxygen added so that not more than one mole of oxygen is added per four moles of halogen acid, whereby the corresponding lead halide is formed by the action of the halogen acid on the molten lead, separating the water from the lead halide, reacting the lead halide at a temperature above 300° C. with metallic aluminum, collecting the evolved aluminum halide vapor and condensing and recovering the aluminum halide.

10. The process of claim 9 in which the halogen recovered is bromine.

11. The process for the recovery of the bromine content of moist hydrobromic acid which comprises passing the moist hydrobromic acid into the bottom portion of a packed reactor, introducing a regulated quantity of oxygen into the reactor such that the quantity of oxygen added is not more than one mole per four moles of hydrogen bromide, flowing molten lead downwardly through the reactor over the packing material while maintaining the temperature within the reactor between 300° C. and 700° C., separating off water vapor from the top of the reactor and withdrawing a mixture of molten lead and lead bromide from the bottom of the reactor, returning the unreacted lead to the reactor, transferring the molten lead bromide to a second reactor containing solid metallic aluminum, maintaining the second reactor at a temperature above 300° C., collecting and condensing aluminum halide vapor evolved from the second reactor, withdrawing the molten lead formed in the second reactor and recycling the lead to the first reactor.

12. The process for the production of an aluminum halide catalyst from a member of the group consisting of metallic aluminum, aluminum carbide, and an alumina-coke mixture, and a moist halogen acid selected from the group consisting of moist hydrochloric acid and moist hydrobromic acid which comprises passing the mixture of halogen acid and water in the vapor phase at a temperature between 300° C. and 700° C. in contact with a metal selected from the group consisting of lead, zinc, tin, silver, copper and mercury, whereby the corresponding metal halide is formed by the action of the halogen acid on the metal, separating the water from the metal halide, reacting the metal halide at a temperature above 300° C. with a member of the group consisting of metallic aluminum, aluminum carbide, and an alumina-coke mixture, collecting the evolved aluminum halide vapor, and condensing and recovering the aluminum halide catalyst.

EVERETT GORIN.